United States Patent [19]

Granath et al.

[11] 4,076,447
[45] Feb. 28, 1978

[54] WATER-POWER MOTOR

[76] Inventors: Einar Granath, Apelvagen 15; Alf Granath, both of Apelvagen 15, 141 46 Huddinge, Sweden

[21] Appl. No.: 626,962

[22] Filed: Oct. 29, 1975

[30] Foreign Application Priority Data

Oct. 30, 1974 Sweden .............................. 7413654

[51] Int. Cl.² .............................................. F03B 13/12
[52] U.S. Cl. ........................................... 415/2; 415/8; 417/329; 417/330
[58] Field of Search ........................................ 415/2-4, 415/8; 417/329, 330, 334; 416/142

[56] References Cited

U.S. PATENT DOCUMENTS

| 8,36X | 3/1808 | Johnson | 416/142 |
|---|---|---|---|
| 641,233 | 1/1900 | Roell | 417/330 |
| 833,361 | 10/1906 | Wilmore | 415/4 |
| 913,770 | 3/1909 | Rockwell, Jr. | 415/4 |
| 1,003,635 | 9/1911 | Melander | 415/4 |
| 3,807,890 | 4/1974 | Wright | 415/2 |

FOREIGN PATENT DOCUMENTS

| 11,062 | 5/1854 | France | 415/8 |
|---|---|---|---|
| 997,942 | 1/1952 | France | 415/3 |

Primary Examiner—C. J. Husar
Attorney, Agent, or Firm—Beveridge, DeGrandi, Kline & Lunsford

[57] ABSTRACT

The invention relates to a water-power motor adapted to be driven by a rising and falling water surface, for instance the wave motion thereof. The novel features of the invention reside in that the water-power motor comprises one or more driving wheels each of which has a plurality of compartments defined in one direction by bottom shutters pivotally mounted in the wheel and allowing the wheel to rotate under water without any appreciable resistance, and in that the wheel or wheels are adapted to cooperate with an equalizer device in the form of a container which is supplied with water when the water surface is on a relatively high level and which in its turn supplies water to the wheel or wheels when the water surface is on a relatively low level.

8 Claims, 3 Drawing Figures

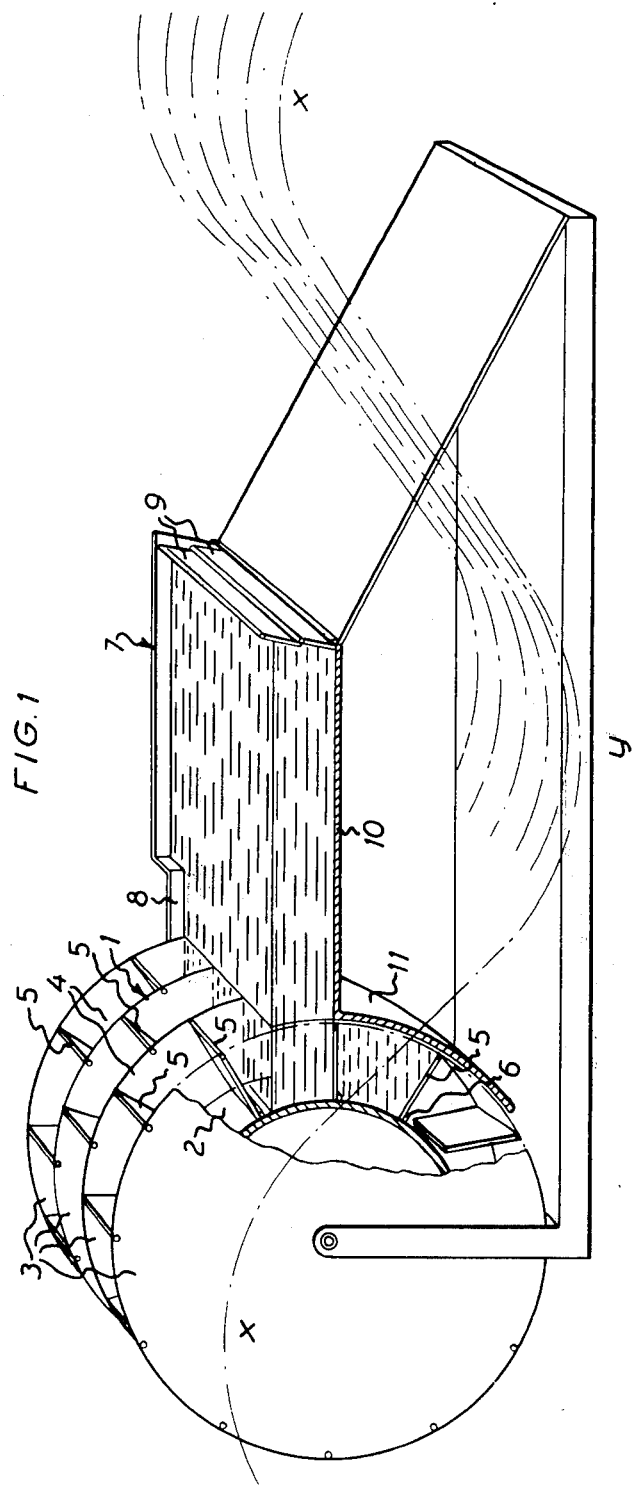

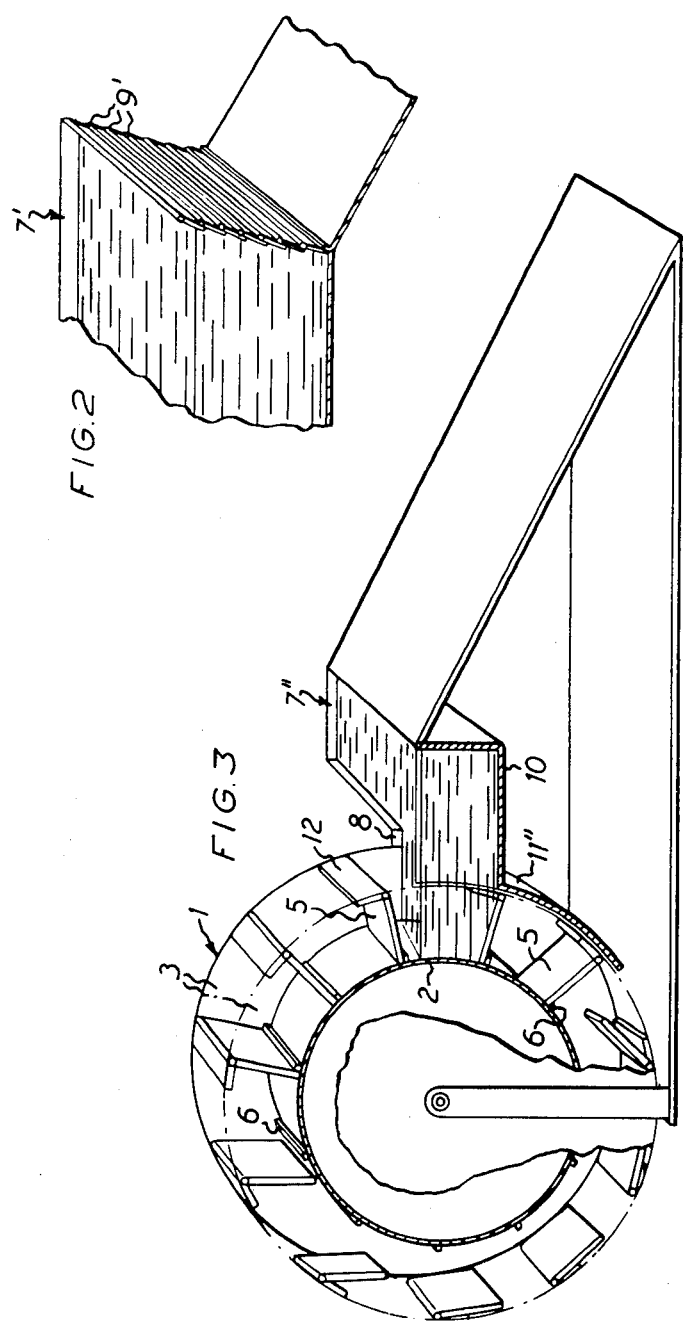

WATER-POWER MOTOR

The present invention relates to a water-power motor preferably for rotating at a relatively low speed by the action of a rising and falling water surface, for instance the wave motion thereof. The motor comprises at least one wheel rotatable on a horizontal axis and a plurality of compartments disposed peripherally in a suitable fashion in the wheel, each compartment being defined by axially and radially disposed walls and by a pivotally mounted shutter disposed transversely of the peripheral surface of the wheel and forming when in one position the bottom of the compartment while allowing when in another position free tangential passage of water through the compartment, said shutter being mounted in such a manner that during one revolution of the wheel it will swing by gravity between a closed position and an open position, and a container is arranged adjacent said wheel to cooperate therewith, from which container water successively flows into the compartments thereby causing the wheel to rotate.

Swedish Pat. Specification No. 363,876 discloses a water-power motor comprising a number of buckets or compartments which are arranged in a rotatable wheel and provided with pivotally mounted bottoms.

The object of the present invention is to provide an apparatus of substantially the same type as the known water-power motor according to said patent specification, which apparatus — despite its simplified construction with regard to the wheel proper — when in use for exploiting wave motion energy offers a smoother run and higher efficiency than the water-power motor according to said patent. The novel features of the apparatus according to the invention reside in that the compartments which are arranged at the wheel periphery and have three fixed walls, are adapted to cooperate with a surface stationary relative to the wheel, which surface during part of the revolution closes the compartment at least partially in the outward direction.

The apparatus according to the invention will be described in greater detail hereinbelow with reference to the accompanying drawings, in which:

FIG. 1 schematically illustrates an embodiment of the apparatus as viewed obliquely from the side and partially in cross-section;

FIG. 2 illustrates, broken away, a portion of an equalizer container having modified inlet flaps; and FIG. 3, like FIG. 1, schematically illustrates an apparatus in which the wheel and the equalizer container have been modified.

In the embodiment of FIG. 1, the wheel 1 comprises a central tubular portion 2, the outwardly facing surface of which forms the inner boundary wall of the compartments, and lateral discs 3 of which the portions located outside the central portion form the side walls of the compartments. Shutters 5 are pivotally mounted adjacent the peripheral portion 4 of the lateral discs 3 and, when in a radial position of abutment against support members 6 provided at the central portion, said shutters form the bottoms of the compartments.

When the compartments descend into the water at the lower portion of the wheel, the shutters are swung backwards against the direction of rotation and thus offer no resistance to the rotary motion of the wheel. During the continuing rotation of the wheel the shutters will resume by gravity such a position as to form again the bottoms of the compartments.

In order to perform its intended function the wheel 1 preferably cooperates with an equalizer container 7 comprising an open-top channel-shaped portion 8 having a bottom and side walls. At one end of the portion 8 are provided flaps 9 which open inwardly and, as shown, pivot about horizontal shafts, but which may of course be of any suitable design. At the opposite end of the channel-shaped portion 8 the side walls of the container extend up to and join the peripheral curvature of the outer lateral discs 3 of the wheel 1. The bottom 10 of the channel-shaped portion is provided with a curved portion 11 extending a distance along the periphery of the wheel 1, preferably a distance corresponding to the peripheral distance between two consecutive shutters.

As will appear from FIG. 1, the wheel is composed of a number of sections, each section being provided with a series of pivotally mounted shutters. The shutters in the different sections are offset with respect to each other, whereby an effect of overlapping is gained. Due to the fact that water contained in one compartment exerts a motive force on the wheel, while at the same time the filling of another compartment has just begun, the rotational movement of the wheel will become smoother and more uniform.

The motor is intended to be positioned in the water such that the wave crests X should be able to enter into and fill the equalizer container 7. The water collected therein will then fill the compartments of the wheel successively thereby causing the wheel to rotate also during the passage of a subsequent wave trough y.

In the embodiment of FIG. 2, the equalizer container 7' has a substantially greater capacity as compared with the container 7 in FIG. 1. The increased depth of the container 7' has necessitated the provision of additional inlet flaps 9'. The flaps are movably mounted in such a manner that flaps inside which there is still water from a previous wave or waves will remain closed, whereas the other flaps are free to open inwardly so as to permit more water to enter. By using the apparatus according to FIG. 2, it is possible to obtain a more uniform water supply and ensure continued rotation of the wheel, even though the supply of water should cease as a result of temporarily lower waves during some periods.

The embodiment of FIG. 3 differs from that of FIG. 1, in that the wheel comprises only one section and in that the compartments have a low outer wall 12 having a height substantially equal to half of a pivotal shutter. As in the embodiment of FIG. 1, the equalizer container 7'', here having no inlet flaps, is provided with an extension 11'', augmenting, together with the low outer walls 12 of the compartments, the capacity of the compartments when these move along the portion of their circular path during which they are filled with water.

The invention must not be considered restricted to that described above or shown in the drawings but may be modified in various ways within the spirit and scope of the accompanying claims.

What we claim and desire to secure by Letters Patent is:

1. A water-power motor, preferably for rotating at a relatively low speed by the action of a rising and falling water surface, for instance the wave motion thereof, wherein said motor comprises at least one wheel rotatable on a horizontal axis and a plurality of compartments disposed peripherally in a suitable fashion in said at least one wheel, each compartment being defined by axially and radially disposed walls and by a pivotally mounted shutter disposed transversely of the peripheral surface of said wheel and forming when in one position the bottom of the compartment while allowing when in another position free tangential passage of water through the compartment, said shutter being mounted in such a manner that during one revolution of the wheel it will swing by gravity between a closed position and an open position, and wherein a container is arranged adjacent said wheel to cooperate therewith, from which container water successively flows into the compartments thereby causing the wheel to rotate, said container being formed so as to allow unimpeded inflow of water thereinto but permitting outflow of water therefrom only via the compartments of the wheel.

2. A water-power motor as claimed in claim 1, wherein the compartments arranged at the periphery of the wheel and provided with three fixed walls are adapted to cooperate with a surface which is stationary with respect to the wheel, and adapted to close at least part of the compartment in the downward direction during part of the revolution thereof.

3. A water-power motor as claimed in claim 2, wherein said stationary surface is arranged at the container serving as an equalizer and adapted to be filled with water from the wave crests, and wherein said container whose open, one end extends up to and joins wheel portions defining the compartments, is in direct communication with the space of a registering compartment.

4. A water-power motor as claimed in claim 2, wherein said stationary surface alone is adapted to define the wheel compartments in one direction.

5. A water-power motor as claimed in claim 2, wherein said stationary surface is adapted to cooperate with a wall arranged at the compartment, and to define together with said wall a wheel compartment in said one direction (FIG. 3).

6. A water-power motor as claimed in claim 1, wherein said equalizer container is provided with inlet flaps serving as one-way valves.

7. A water-power motor as claimed in claim 6, wherein a number of superposed inlet valves are separately mounted such that only flaps unaffected by the water held in the container open to allow water to enter.

8. A water-power motor as claimed in claim 1, wherein the pivotal bottom shutters are mounted adjacent the outer portion of the compartments.

* * * * *